Sept. 6, 1960  J. A. WOODS  2,951,317
METHOD OF PRODUCING MULTIPLE SHEET GLAZING UNITS
Filed Feb. 27, 1953  6 Sheets-Sheet 1

INVENTOR.
John A. Woods
BY
Nobbe & Swope
ATTORNEYS

Sept. 6, 1960  J. A. WOODS  2,951,317
METHOD OF PRODUCING MULTIPLE SHEET GLAZING UNITS
Filed Feb. 27, 1953  6 Sheets-Sheet 3

INVENTOR.
John A. Woods
BY Nobbe & Swope
ATTORNEYS

INVENTOR.
John A. Woods
BY Nobbe & Swope
ATTORNEYS

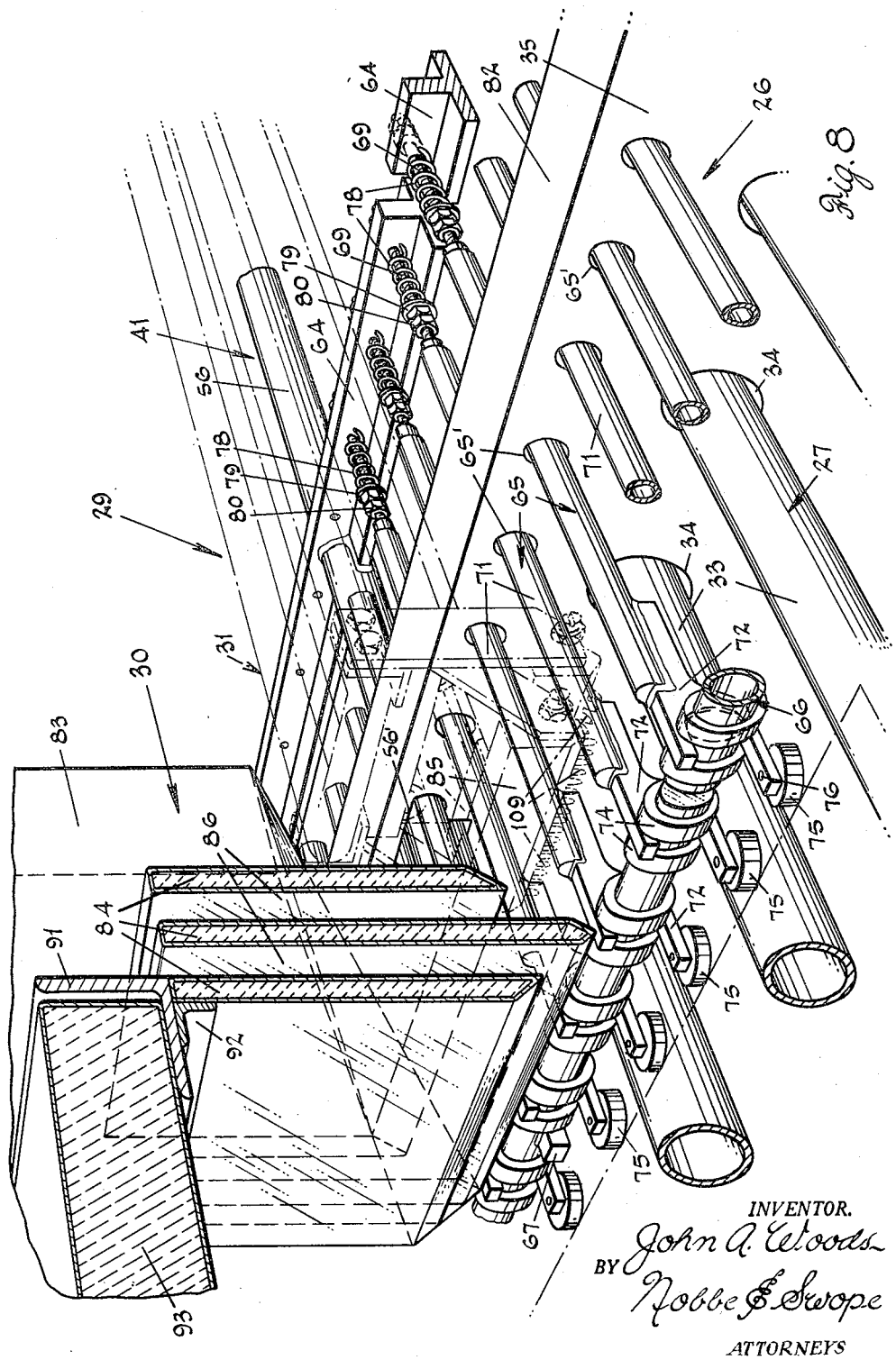

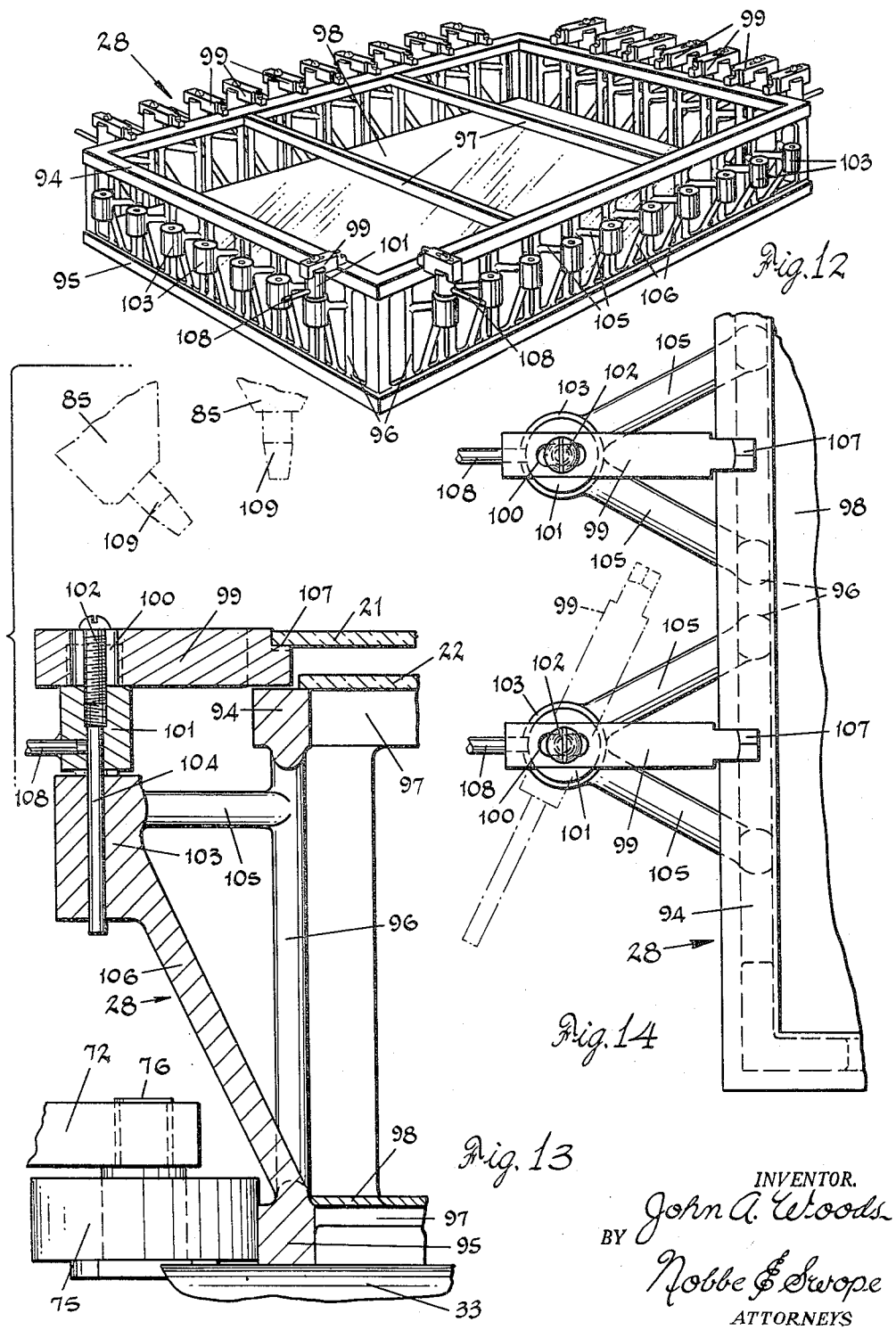

United States Patent Office 2,951,317
Patented Sept. 6, 1960

2,951,317

METHOD OF PRODUCING MULTIPLE SHEET GLAZING UNITS

John A. Woods, Toledo, Ohio, assignor to Libbey-Owens-Ford Glass Company, Toledo, Ohio, a corporation of Ohio Filed Feb. 27, 1953, Ser. No. 339,229

5 Claims. (Cl. 49—82)

This invention relates broadly to the production of multiple sheet glazing units. More specifically, it relates to an improved method of sealing together the marginal edge portions of spaced sheets of glass to produce hermetically sealed multiple sheet glazing units composed entirely of glass.

Multiple sheet glazing units may be described generally as comprising two or more sheets of glass which are sealed together entirely around their marginal edge portions in spaced relation to provide a hermetically sealed dead air space therebetween. Due principally to their insulating and condensation preventing qualities, such units have become well established fixtures in the building trades and have found wide usage as windows for buildings, show cases, vehicles, refrigerators, and the like.

In the early development of the multiple sheet glazing art, it was customary to seal together the marginal edge portions of the spaced sheets of glass by means of strips of a substantially impervious material which were placed between said portions and bonded thereto in any suitable manner. In many cases, the seal so produced was found not to be hermetic and the unit thus impractical for the purposes of improved insulation and the prevention of condensation. As well, in other instances, the sealing process was found to be so cumbersome and expensive that production on a mass basis was practically impossible.

It has been proposed to form multiple sheet glazing units of the type described entirely of glass by sealing together the marginal edge portions of spaced sheets of glass. According to one method of production, which is described in detail in a copending application, now abandoned, Serial No. 300,884, filed on July 25, 1952, by John A. Woods, Donald E. Sharp, and Alfred E. Badger, and assigned to the assignee of the present application, the spaced sheets of glass are passed through a closed furnace to preheat said sheets and then guided between impinging flames from opposed burners at locations interiorly of said furnace to seal first one and then the other pair of opposite marginal edge portions thereof. The opposed burners disclosed in the aforementioned copending application are mounted outwardly of the furnace and are provided with head members which project interiorly of said furnace so as to impinge flames upon and thus fuse together said opposed marginal edge portions of the glass sheets being moved therepast within said furnace.

It is a principal object of this invention to provide an improved method of producing all-glass multiple sheet glazing units having increased strength and insulating qualities.

It is another object of this invention to provide an improved method of sealing together the marginal edge portions of spaced sheets of glass in which said portions when sealed are rendered more resistant to rupture.

Still another object of this invention is to provide an improved method of sealing together the marginal edge portions of spaced sheets of glass in which said sheets are preheated within a furnace and sealed exteriorly thereof by impinging concentrated heat sources.

Still another object of this invention is to provide an improved method of producing multiple sheet glazing units in which the marginal edge portions of said sheets are sealed together exteriorly of a furnace through which they are continuously moved.

Still another object of this invention is to provide an improved method of sealing together the marginal edge portions of spaced sheets of glass in which concentrated heat sources are impinged on said edge portions and the radiant heat therefrom quickly exhausted from adjacent portions of said sheets.

Still another object of this invention is to provide an improved method of sealing together the marginal edge portions of spaced sheets of glass in which spaced sheets of glass are preheated within a furnace while being moved continuously therethrough, the marginal edge portions of said sheets are sealed by concentrated heat sources in an atmosphere exteriorly of said furnace, and radiant heat from said concentrated heat sources is exhausted from adjacent portions of said sheets.

Still another object of this invention is to provide an improved method of moving the marginal edge portions of spaced sheets of glass past concentrated heat sources in perfectly aligned relation therewith.

Other objects and advantages of the invention will become more apparent during the course of the following description when taken in connection with the accompanying drawings.

In producing all-glass multiple sheet glazing units possessing maximum insulating qualities and resistance to rupture at widely varying altitudes, it is essential that the hermetically sealed air space between said sheets be uniform in thickness. That is, it is of prime importance that units of this type be produced in such a manner that the spaced sheets thereof are almost exactly in parallel planar relationship with one another such that they are spaced apart the same distance at any point of the unit. Thus, optimum working conditions demand that there be no more than negligible sag in either sheet during the actual sealing of the marginal edge portions thereof.

I have found that when all-glass multiple sheet glazing units are produced generally according to the method described in the aforementioned copending application, in which the edge portions of said sheets are sealed by concentrated heat sources interiorly of a furnace through which they are moved, the radiant heat from said sources has a tendency to soften the central flat portions of said sheets and thus cause them to sag. That is, it will be understood that the heat from said sources, in causing the marginal edge portions of said sheets to rather quickly become molten and seal together, is of such great intensity that, even though impinged directly on said edge portions, it will radiate to the adjacent flat portions of the sheets.

I have also found that this intense heat sets up severe internal pressure and air currents within the furnace adjacent the sources such that the flames from said sources are frequently caused to fluctuate or waver rather violently. In this manner, it is difficult to maintain said flames in a constant impinging and predetermined relation with respect to the marginal edge portions of the glass sheets being moved therepast. As a result, the unit may be unevenly sealed such that a sharp angle is formed at the joinder of said sheets, which angles have been found to be potential rupture points.

I propose to overcome the above-mentioned difficulties and to provide other improved production techniques by means of the novel method of this invention. This method consists in continuously passing spaced sheets of glass through a furnace for preheating the same, aligning the marginal edge portions of said sheets with concentrated heat sources disposed along the path of said sheets, sealing together the marginal edge portions of said sheets with said concentrated heat sources in an atmosphere exteriorly of said furnace, and exhausting the radiant heat from said sources above the adjacent central portions of said sheets.

It has also been found that when sealing is effected in the atmosphere exteriorly of the furnace, there is better combustion of the fuel gas due to the increased supply of oxygen. When the natural gas-oxygen mixture is burned in the air outside of the furnace, rather than in the muffled atmosphere inside thereof, the flames are both cleaner and hotter and are productive of better marginal seals.

In the accompanying drawings, wherein like numerals are employed to designate like parts throughout the same:

Fig. 8 is an enlarged perspective transverse sectional view of the apparatus, with the concentrated heat sources shown in phantom.

Fig. 9 is a transverse sectional view of the aligning means taken substantially along line 9—9 of Fig. 5;

Fig. 12 is a perspective view of a tray upon which the glass sheets may be moved through the furnace and past the concentrated heat sources;

Fig. 13 is an enlarged transverse sectional view of one side of the tray in operative relation with the aligning means and concentrated heat sources; and Fig. 14 is a top plan view of the tray of Fig. 13, illustrating the operation of sheet edge supporting fingers thereof.

Figure 1:
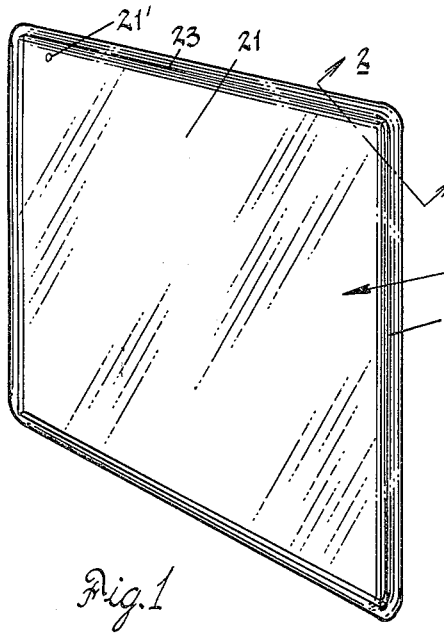
Fig. 1 is a perspective view of an all-glass multiple sheet glazing unit produced in accordance with this invention.
Figure 2:
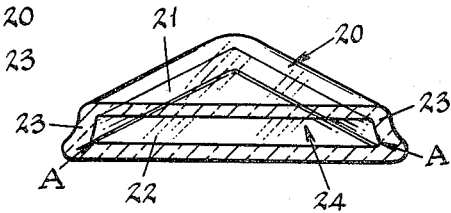
Fig. 2 is a perspective sectional view of a corner of the unit taken substantially along the line 2—2.

Referring now particularly to the above described drawings, there is shown in Fig. 1 an all-glass, multiple sheet glazing unit 20 the marginal edge portions of which have been sealed together entirely therearound by means of the method and apparatus of this invention. This unit 20, shown in section in Fig. 2, comprises upper and lower sheets of glass 21 and 22, respectively, a dehydration hole 21' in said upper sheet, and side portions 23 which are formed from the fused marginal edge portions of said sheets and which enclose between said sheets an air space 24. The critical portion of the unit 20—i.e., the portion thereof most susceptible to rupture—occurs along the line of joinder between the marginal edge portions of the upper and lower sheets of glass 21 and 22. As described more fully in the aforementioned copending application, Serial No. 300,884, according to this general method of production in which flames from a concentrated heat source are impinged upon said marginal edge portions, this line of joinder extends substantially between the inner and outer lower corners of the unit.

The joinder of side portions 23 and lower sheet 22 forms an inner edge within the air space 24 and describes therebetween an angle A. Maximum resistance to rupture is obtained when this inner edge is slightly filleted and the angle A is made less acute. Thus, it is of prime importance that the marginal edge portions of upper sheet 21 be caused to fully settle upon those of the lower sheet 22 to form a slightly filleted broad angle at A. As well, it will be noted from Fig. 2 that the upper and lower sheets 21 and 22 lie in substantially parallel planes such that the depth of air space 24 is the same at any point within the unit 20.

Figure 3:
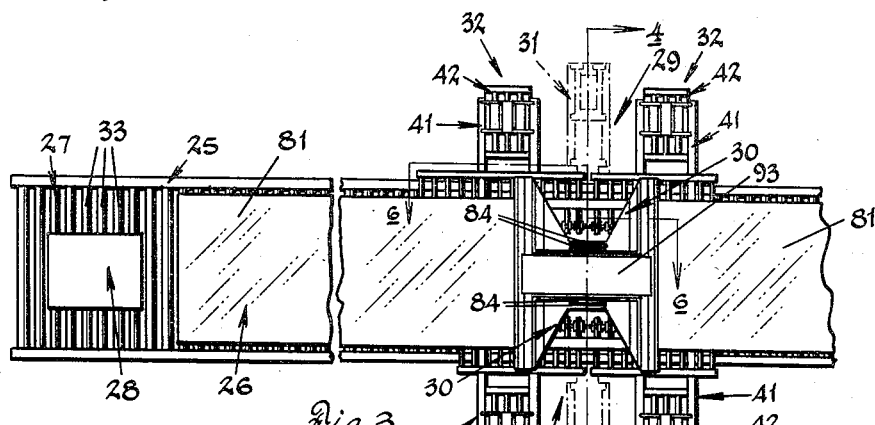
Fig. 3 is a partial plan view of the overall apparatus of this invention, with the concentrated heat sources shown in phantom.
Figure 4:
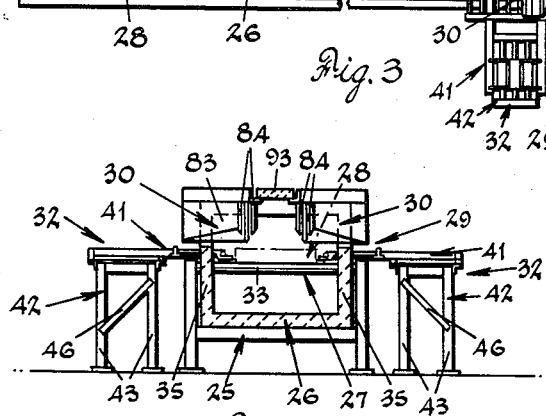
Fig. 4 is a transverse sectional view of the apparatus of Fig. 3 taken substantially along line 4—4.

A part of the overall apparatus for producing the unit 20 is shown in plan and section, respectively, in Figs. 3 and 4. This apparatus includes a frame structure 25, a furnace 26 supported on said frame, conveyor means 27 associated with said frame and partially disposed within said furnace, and a tray 28 (shown diagrammatically in Fig. 3 and in phantom in Fig. 4) for supporting the glass sheets of the unit 20 and adapted to be moved by the conveyor means 27 through the furnace 26.

Disposed along the furnace is a sealing station 29 having open ports 30 at opposite sides thereof. Partially disposed within the ports 30 and in position to impinge flames upon the marginal edge portions of the glass sheets 21 and 22 being moved therepast on tray 28 are burners 31 (shown in phantom in Fig. 3). Aligning means 32 are provided adjacent said open ports 30 and act to guide the tray 28 between the concentrated heat sources from the burners 31 in a manner to cause opposite marginal edge portions of the spaced sheets 21 and 22 to be aligned therewith while moving therepast.

It will be understood from the aforementioned copending application, Serial No. 300,884, that in producing multiple sheet glazing units generally by impinging flames on the opposite marginal edge portions of spaced sheets of glass, the overall apparatus of this invention would necessarily include one or more additional sealing stations similar to that shown in Fig. 3 for sealing said sheets entirely therearound. It will also be understood that the areas of the furnace 26 forwardly of each of said sealing stations are provided with suitable heating means (not shown) for preheating the spaced sheets in a manner and for a purpose well known in the art.

The conveyor means 27 includes a series of equally spaced cylindrical rollers 33 which extend transversely of the furnace 26 through openings 34 in the side walls 35 thereof. The opposite ends of the rollers 33 are supported on pillow bearings 36 mounted on a support 37, one end of each roller having a sprocket 38 attached thereto and meshing with a continuous chain 39. The chain and gear may be guarded by a shield 40 (Fig. 5) and the chain driven by suitable power means (not shown) to cause the rollers 33 to provide continuous forward and substantially straight line movement through the furnace 26.

Figure 10:
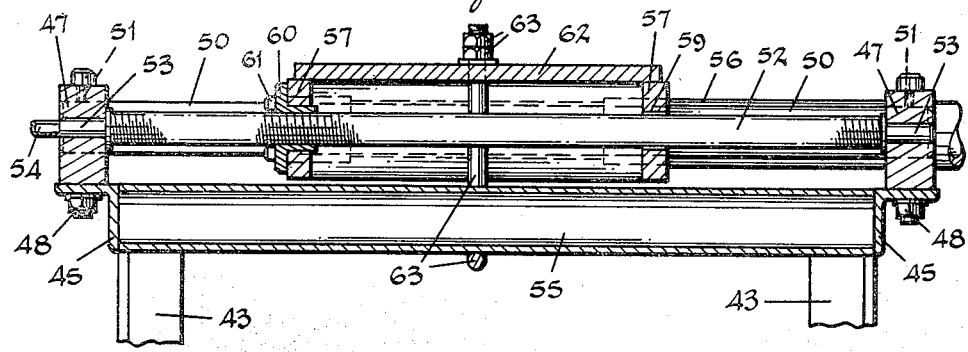
Fig. 10 is a longitudinal sectional view of the aligning means taken substantially along line 10—10 of Fig. 9.

The novel aligning means 32 comprises one or more sets of inwardly disposed guide rollers at opposite sides of the furnace 26 and adjacent the open areas 30. Each set of rollers is mounted on a frame 41 supported by and movable over a stand 42. The stand 42 is composed of upright angle irons 43 which are connected longitudinally and transversely by angle irons 44 and 45, respectively, and strengthened by braces 46. Bearing blocks 47 are mounted on and anchored to opposite transverse angle irons 45 by bolts 48 and are connected to one another by rods 49 (Fig. 9) as well as rod-like guide members 50 removably received at opposite ends in said bearing blocks by set screws 51 (Fig. 10).

Disposed longitudinally between the guide rods 50 is a threaded rod 52 having spindles 53 at its opposite ends rotatably received in the bearing blocks 47. The rear spindle is extended outwardly of the rear bearing block and finished to provide a squared shank 54 which may be turned by any suitable wrench or the like. In this manner, threaded rod 52 may be rotated and caused to act as a driving member in moving the frame 41 longitudinally of the stand 42, in a manner to be described. Disposed below threaded rod 52 and secured at opposite ends to transverse angle irons 45 is a tubular rod 55, the purpose of which will be apparent in connection with the movement of frame 41.

The frame 41 includes rods 56 which are extended longitudinally in substantial horizontal alignment with guide rods 50 and threaded rod 52 and project inwardly of the furnace 26 through openings 56' in side walls 35 thereof. Spaced transverse bars 57 are welded at their opposite ends to outer ends of the rods 56 and receive therebetween sleeves 58 which surround guide rods 50 of the stand 42 in slidable engagement therewith. As shown in Fig. 10, threaded rod 52 is loosely received by the innermost bar 57 through an opening 59 therein and threadedly received by a bushing 60 secured in the outermost bar by bolts 61.

A plate 62 is extended longitudinally above threaded rod 52 and supported at opposite ends on the bars 57. A U-shaped strap 63 is suspended from said plate by nuts 63' and engages the tubular rod 55 of the stand 42, as shown in Figs. 9 and 10. It will thus be seen, as previously noted, that the threaded rod 52 may be rotated to actuate the movement of the frame 41 in causing bushing 60 to move longitudinally on said rod. As well, the frame 41 can be locked in place on the stand 42 upon tightening of the nuts 63' to bring the strap 63 into tight engagement with the tubular rod 55.

Figure 11:
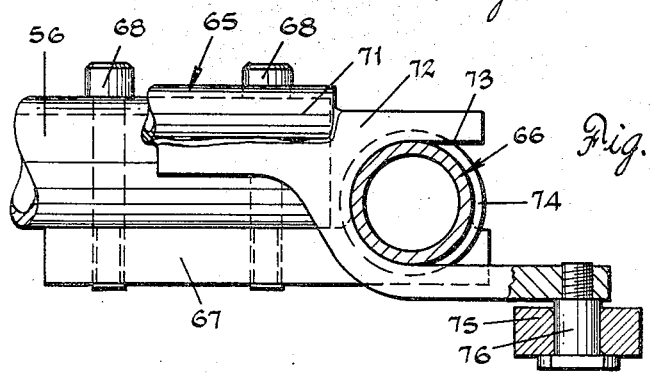
Fig. 11 is a detail sectional view of the aligning means taken substantially along line 11—11 of Fig. 6.

Transverse header members 64 are welded to the rods 56 intermediate the lengths of said rods and outwardly of furnace walls 35 to carry the outer ends of individual, longitudinally extending guide roller supports 65. The roller supports 65 project inwardly of furnace walls 35 through openings 65' therein in parallel relation with the rods 56. The inner ends of said supports are carried interiorly of the furnace walls 35 by a transversely extending tubular rod 66 which is welded to bars 67 extending outwardly from and secured to the inner ends of the rods 56 by bolts 68 (see Fig. 11).

Figure 7:
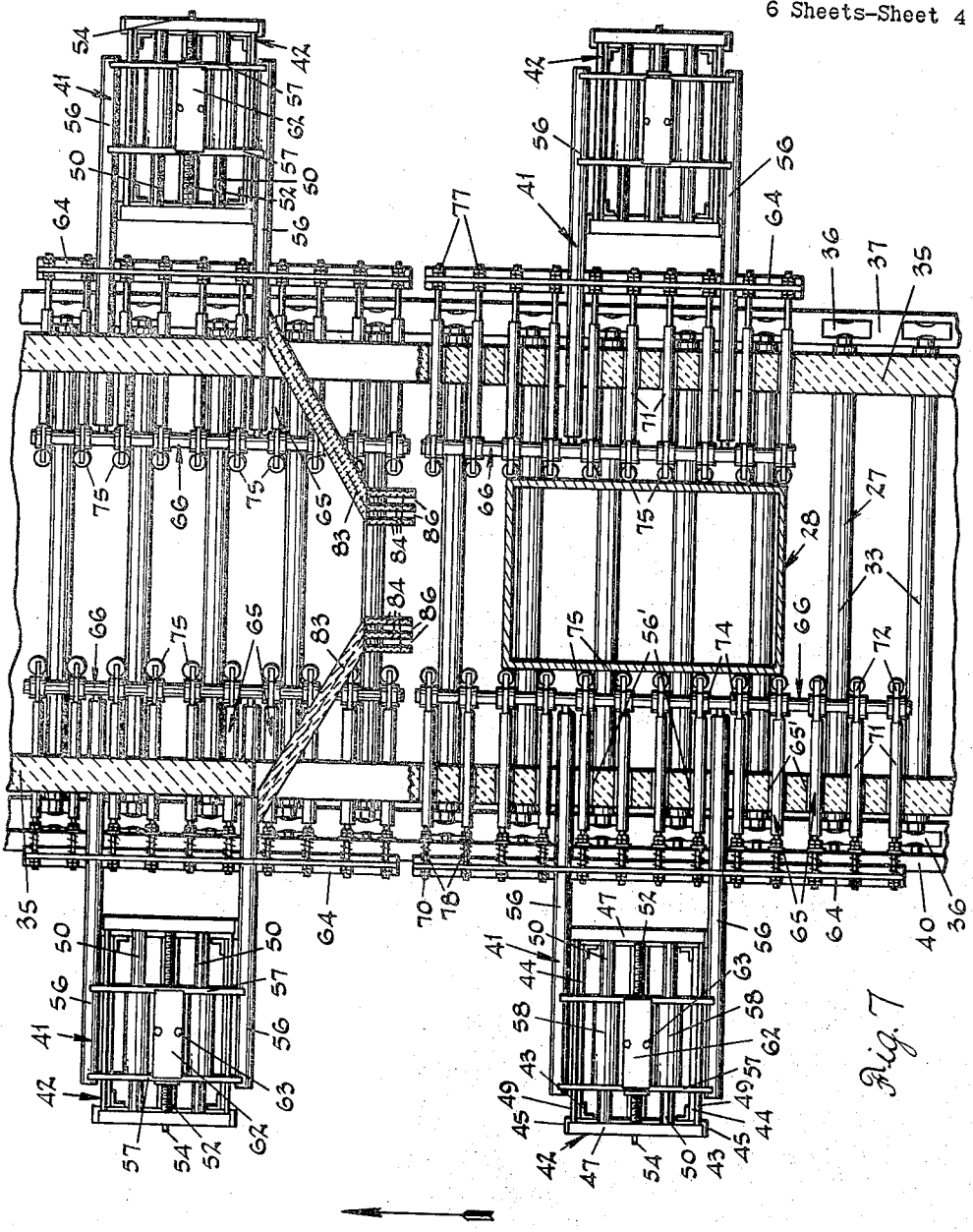
Fig. 7 is a horizontal sectional view taken substantially along line 7—7 of Fig. 6.

The individual guide roller supports 65 at one side of the furnace, in this case the leftmost in Fig. 7, are spring-loaded with respect to header member 64 and those at the opposite side are rigidly mounted with respect thereto. In both instances, however, each roller support 65 includes a threaded shank portion 69 at its outer end which is received through an opening in the header member 64. Nuts 70 are disposed over the outer threaded end of shank portion 69 to bear against header member 64 when the roller support is operatively extended into the furnace 26. The inner end of the enlarger inner portion 71 of each of the roller supports 65 has welded thereto a shoe 72 having a recess 73 adapted to partially surround and engage the transverse tubular rod 66. Guide collars 74 on the rod 66 at opposite sides of the shoe 72 serve to guide the same therebetween. Guide rollers 75 are suspended from the end of each of the shoes 72 by means of pins 76 upon which said rollers are rotatably mounted.

The roller supports 65 at one side of the furnace are rigidly mounted with respect to header member 64 by lock nuts 77 (Fig. 7) disposed on the threaded shank portions 69 opposite the nuts 70 and securing said shank portions to said header member. It will be understood, however, that although roller supports 65 may thus be rigidly secured with respect to said header member, the effective length of said supports may be adjusted by means of nuts 70 and 77 to permit the shoes 72 on said roller supports to be moved longitudinally over tubular rod 66 and between guide collars 74. The roller supports 65 at the opposite side of the furnace are spring-loaded by means of coil springs 78 around the shank portions 69 thereof and compressed between the header member 64 and washer 79 held in place at the desired position along said shank portions by lock nuts 80. In this manner, the compression in the coil springs 78 may be readily adjusted by manipulation of the lock nuts 80. It will be apparent then that each of the spring-loaded guide roller supports 65 is movable longitudinally with respect to header member 64 and tubular rod 66 when rollers 75 suspended therefrom are subjected to lateral pressure.

It can be seen from Fig. 7 that the sets of rigidly mounted and spring-loaded rollers 75 are disposed opposite one another and, in this case, two sets of the same are used at each side of the furnace 26 at the sealing station 29. It will also be noted that the rollers 75 are located adjacent the sealing station 29 and extend longitudinally forwardly and rearwardly thereof along the length of the furnace so as to properly align the tray 28 prior to and during its movement past the concentrated heat sources from the burners 31. Specifically, in Fig. 7 wherein the tray 28 is adapted to move in the direction of the arrow, there are additional rollers 75 on the spring-loaded side extending forwardly of the sealing station which are adapted to first engage a side of said tray.

In actual practice, it has been found that the tray 28 has a slight tendency to be twisted or turned toward one side of the furnace. Thus, the additional rollers 75 at the spring-loaded side act to "right" the tray and guide it properly between the succeeding oppositely disposed rollers. Inasmuch as one side of the rollers is spring-loaded, there is no tendency for the tray to "bind" in passing between the opposite sets of the same. In carrying out the method of this invention, the frames 41 may be located on the strands 42 in such a manner that the tray 28 and the marginal edge portions of the glass sheets carried thereon will be moved past concentrated heat sources on the burners 31 in perfectly aligned and properly spaced relation.

Figure 5:
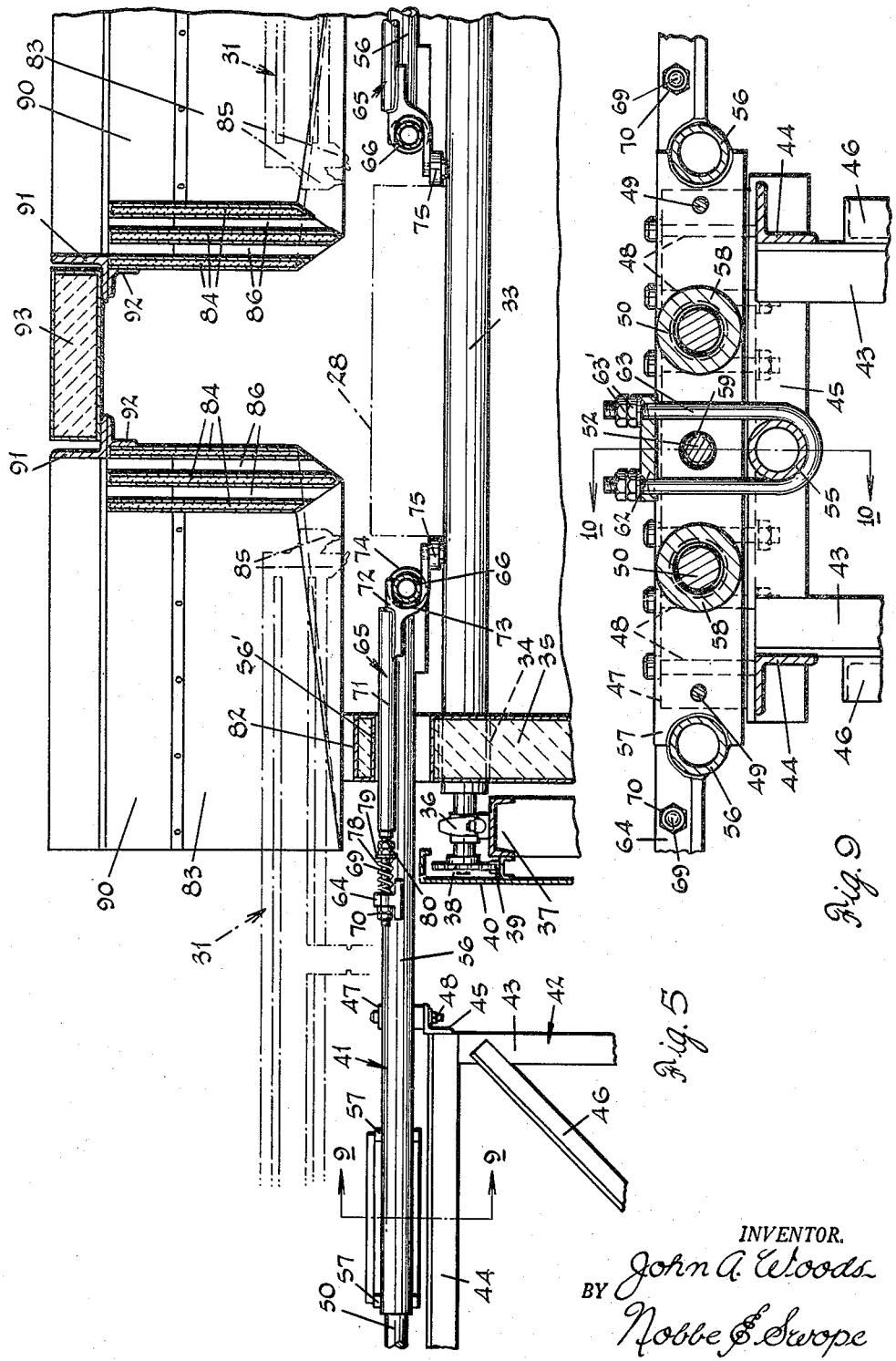
Fig. 5 is a partial enlarged section view similar to that of Fig. 4.
Figure 6:
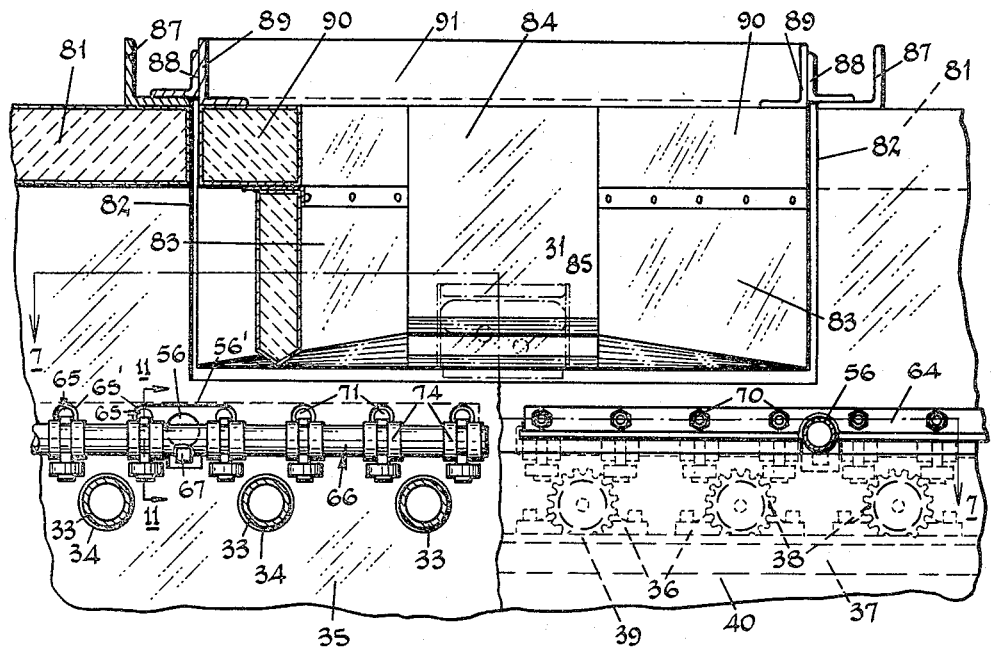
Fig. 6 is an enlarged longitudinal sectional view of the apparatus of Fig. 3 taken substantially along line 6—6.

Dealing now specifically with the construction of the sealing station 29, the side walls 35 and top wall 81 of the furnace 26 are provided with oppositely disposed cut-away sections or cut out portions 82 (Fig. 6). V-shaped open ports or bays 30 are formed at opposite sides in said cut-away sections of the furnace by means of a removable baffle construction which includes convergent side walls 83 intersecting with spaced walls 84. As best shown in Fig. 5, the spaced walls of the baffle construction are disposed inwardly of the furnace side walls 35 at a point substantially above but slightly inwardly of the path of the opposite edges of the tray 28. In this manner, the burner heads 85 (shown in phantom in Figs. 5 and 8) of the burners 31 may be positioned in impinging relation with respect to the marginal edge portions of the glass sheets being moved therepast, in a manner more fully described in the aforementioned copending application, Serial No. 300,884. As well, this arrangement of the spaced walls 84 will permit the excess heat from the flames of said burner heads to be exhausted through the flues 86 formed between said walls.

As best shown in Fig. 6, the removable baffle construction forming the V-shaped open ports 30 is supported from angle irons 87 secured to and extended transversely across the top wall 81 of the furnace by means of hangers 88 welded back-to-back to angle irons 89 supporting top baffle walls 90. Each of the top baffle walls 90 is of triangular shape in plan to correspond to the convergency of the side walls 83 so as to provide a substantially closed furnace structure at both sides of the open ports 30. As best shown in Fig. 5, angle irons 91 are supported on and extend lengthwise of the innermost of the spaced walls 84 by means of braces 92 to provide ledges upon which a separately removable top plate 93 may be placed. The top plate 93 extends across both the space between the opposite sets of spaced walls 84 as well as the space between opposite sets of the top baffle walls 90. The side walls 83 are shaped along their lengths so as to culminate at their inner ends adjacent spaced walls 84 in a substantial V construction whereby said walls 84 are pitched downwardly, as shown in Figs. 5 and 8. The walls forming the baffle construction may be made of any suitable heat resistant material such as that of the furnace 26. I have found, however, that walls of Inconel with fiber glass insulation provide excellent results.

As previously mentioned, the spaced walls 84 are preferably placed in such a position that radiant heat from the burner heads 85 may be exhausted through the flues 86. It will be understood, however, that in sealing together glass sheets of varying sizes, it may be advantageous to alter the position of the flues 86. The furnace construction of this invention is particularly adapted to such a contingency inasmuch as the baffle construction may be readily removed and replaced by a similar construction in which the flues 86 are particularly located so as to be properly disposed over the marginal edge portions of the glass sheets being sealed. As well, the independently removable top plate 93 permits quick entry into the interior of the furnace through an opening corresponding to the dimensions of the tray 28, thus further permitting rapid evacuation of said tray if necessary.

It will also be noted that the V-shaped cross-sectional construction of the spaced walls 84 defining the flues 86 permits speedy exhaustion of the radiant heat from the burner heads 85. As can best be seen from Fig. 5, this heat will be reflected from the glass sheets supported on the top of tray 28 in the general direction of the lower edges of the walls 84. The V shape prevents muffling of the heat above the glass sheets and thereby aids in quickly directing the heat upwardly due to the draft created in the flues 86.

As shown in Fig. 12 in plan, the tray 28 corresponds generally to the outline of the glass sheets 21 and 22 supported thereon. As shown herein for purposes of illustration, the tray and sheets are rectangular although, of course, they may be square or of any other rectilinear design. The upper and lower rims 94 and 95, respectively, of the tray 28 are rigidly connected together by vertical struts 96 and strengthened by lateral braces 97. A pan 98 of sheet metal or other suitable material is supported on the upper edge of the lower rim 95 and serves to shield the underside of lower glass sheet 22 resting on the inner edge of the upper rim 94 from the heat of the furnace. In combination with the lateral braces 97 for the upper rim 94, the shield 98 serves to prevent bending or bowing of the central flat portions of lower sheet 22 in the sealed unit 20. The shield or pan serves the additional purpose of preventing particles of glass from falling within the furnace in case of breakage of the glass sheets.

The upper sheet 21 is supported in equally spaced relation above lower sheet 22 by a series of fingers 99 at all four edges of the tray. Each of the fingers 99 is slotted longitudinally at 100 and is slidably received in a recess in a stud 101. A threaded bolt 102 extending through the slot 100 and received in the stud 101 serves to connect the finger to said stud. The stud is rotatably mounted above a vertical bearing member 103 by a pin 104 depending from said stud and rotatably received in a central opening in said bearing member. The bearing member 103 is supported outwardly of the side of tray 28 by lateral and oblique struts 105 and 106, respectively, projecting outwardly from vertical struts 96 and lower rim 95.

The inner end of each of the fingers 99 is provided with a pitched ledge 107 which is adapted to make line contact with a lower marginal edge portion of the upper glass sheet 21. Thus, all four sides of the upper sheet may be supported at a series of points on the ledges 107 so as to project slightly outwardly from lower sheet 22, as shown in Fig. 13 and for a purpose explained in detail in the aforementioned copending application, Serial No. 300,884. It will be noted, however, that each of the fingers 99 is pivotally mounted by the pin 104 so as to be selectively movable into and out of (as shown by the phantom lines of Fig. 14) upper sheet edge supporting position. As well, each finger may be adjusted inwardly and outwardly by manipulation of threaded bolt 102 for accommodating sheets of different sizes.

A handle 108 is received in each of the studs 101 and projects outwardly therefrom for pivotally moving its respective finger 99 out of the supporting position at or just prior to the actual sealing of the adjacent portion of the glass sheet supported thereby. As described in copending application, Serial No. 300,884, the actuation of the handles is coordinated with the edge sealing means by "knock-out" pins or the like (not shown) which may be mounted, for example, on the burner 31 or at a predetermined location within the furnace. This particular feature does not form a part of this invention. It should be noted, however, that the tray 28 of my improved apparatus is constructed so as to adequately support the glass sheets 21 and 22 and yet only have minimum contact therewith. In particular, the finger 99 is mounted with respect to the upper rim 94 of the tray so as to be movable thereover with the lower sheet 22 supported on said rim by only a small peripheral area of the marginal edge portions thereof. Of course, as previously noted, the ledges 107 of the fingers 99 provide only line contact with the marginal edge portions of the upper glass sheet 21.

As shown in phantom in Fig. 13, nozzles 109 from the burner heads 85 of the burner 31 may be moved into position so as to impinge flames upon the marginal edge portions of the glass sheets 21 and 22 being moved therepast. At this time, the opposite sides of the tray 28 will be firmly engaged by the opposed series of rollers 75 (as shown in said figure) for maintaining said marginal edge portions in properly aligned position with respect to the impinging flames. It is for this purpose, that the rollers 75 are extended forwardly and rearwardly of the sealing station 29. That is, the rollers are so disposed such that during the passage of the entire lengths of the marginal edge portions of the glass sheets past the burner heads 85, said portions will at all times be properly aligned therewith. Thus, as shown in Fig. 7, the tray 28 is engaged at opposite sides by the rollers 75 so as to be properly aligned as it enters the sealing station 29 and just prior to its passing the burners 31.

In this respect, it can be seen from the phantom lines of Fig. 8 that the particular burner apparatus 31 found well suited for carrying out this invention, and described in detail in the aforementioned application filed of even date herewith by Albert W. Olson and John A. Woods, includes a pair of separately movable burner heads 85, each having a series of aligned nozzles 109. It has been the practice in sealing the marginal edge portions of spaced sheets of glass according to this general method to impinge flames from the burner heads on directly opposite edge portions of the sheets. During the sealing of said edge portions, dehydration hole 21' permits the interior of the unit 20 to "breathe." Subsequent to the sealing of the unit entirely therearound, the air space may be dehydrated and the hole 21' hermetically sealed.

Viewing now the overall operation, the glass sheets 21 and 22 are initially placed on the tray 28 and carried, as shown in Fig. 13, in equally spaced relation. The loaded tray may then be placed on the conveyor means 27, as shown in Fig. 3, in approximately aligned position with respect to the guide rollers 75 adjacent the sealing station 29. The tray is then carried by the conveyor means 27 through that portion of the tunnel-like furnace 26 forwardly of said sealing station for the purpose of gradually preheating the glass sheets prior to the sealing of the marginal edge portions thereof.

By means of the novel aligning apparatus described hereinabove, the opposite series of the guide rollers 75 may be spaced to engage the opposite sides of the tray 28 and thus properly align the marginal edge portions of the glass sheets 21 and 22 with respect to the concentrated heat sources of the burners 31. As well, the removable baffle construction may be positioned at the sealing station 29 so that the open ports 30 and flues 86 thereof are properly disposed with respect to said concentrated heat sources. Of course, the relative disposition of the burner heads 85, and thus the aligning apparatus and removable baffle construction of this invention, is dependent upon the size of the glass sheets to be sealed. That is, the optimum sealing relation of the concentrated heat sources with respect to the marginal edge portions of the glass sheets having been determined, the burners 31 are located accordingly to accommodate the particular glass sheets being sealed.

Generally, however, it is necessary that the open ports 30 extend inwardly far enough to permit the actual sealing of the glass sheet edge portions in an atmosphere exteriorly of the furnace, as best shown in Fig. 5. As previously mentioned, the spaced walls 84 form the inner dimension of the open port 30 and define flues 86 which are disposed generally in the path of radiant heat from the concentrated heat sources which is reflected from the upper sheet 21 on the tray 28. As well, the ends of the walls 84 depend downwardly in V fashion to a point slightly above the upper side of the upper glass sheet 21. In this manner, the flames from the burner heads 85 are shielded from the turbulent heat currents interiorly of the furnace and, at the same time, the radiant heat from the concentrated heat sources will not be trapped or muffled over the adjacent portions of the glass sheets but is permitted to escape into the flues 86.

If necessary, auxiliary guiding means (not shown) may be used in urging the forwardly moving tray 28 into contact with the first series (leftmost in Fig. 7) of guide rollers 75 which are spring-loaded and thus form a resilient aligning means against which the tray may be generally "righted." As the tray 28 moves between opposed rollers 75, as shown in Fig. 7, the combination of the rigid and resilient mounts for the same permit the aligning means to adapt itself to the width of the tray without causing said tray to "bind" or be directed off its aligned path.

As the tray 28 moves between the opposed burner heads 85, impinging flames from the nozzles 109 thereof act to seal the opposite marginal edge portions of the sheets 21 and 22 in a manner described above. As previously noted, the actual sealing takes place at the open ports 30 in an atmosphere exteriorly of the furnace and the radiant heat from the concentrated heat sources is quickly exhausted from the central flat portions of the glass sheets.

As the rearward portions of the marginal edges of the sheets are being sealed, the tray 28 is maintained in proper alignment with the concentrated heat sources by means of the guide rollers 75 which extend beyond the sealing station 29. As previously mentioned, additional sealing stations similar to the one herein described may be provided for sealing the other edges of the glass sheets until the unit 20 is sealed entirely therearound.

It is to be understood that the form of the invention disclosed herein is to be taken as the preferred embodiment theeref, and that various changes in the shape, size and arrangement of parts may be resorted to without departing from the spirit of the invention or the scope of the following claims.

I claim:

1. A method of sealing together the marginal edge portions of spaced sheets of glass while continuously moving said sheets through a tunnel-like furnace, comprising the steps of preheating said sheets in their entirety within said furnace, providing concentrated heat sources at a sealing station disposed along said furnace, aligning marginal edge portions of said sheets with respect to said concentrated heat sources, and impinging flames from said concentrated heat sources onto said edge portions during their movement therepast in an atmosphere exteriorly of said furnace while maintaining the other portions of said sheets within said furnace.

2. A method of the character defined in claim 1, including the further step of shielding the flames of said concentrated heat sources from air currents within said furnace.

3. A method of sealing together the marginal edge portions of spaced sheets of glass while continuously moving said sheets through a tunnel-like furnace, comprising the steps of aligning marginal edge portions of said sheets with respect to concentrated heat sources arranged exteriorly of said furnace while maintaining other portions of said glass sheets within said furnace, impinging said flames from said heat sources onto said edge portions during their movement therepast to seal the same, and quickly exhausting the heat of said concentrated heat sources from the portions of said sheets adjacent said marginal edge portions.

4. A method of sealing together the marginal edge portions of spaced sheets of glass to produce multiple glass sheet glazing units which comprises heating said sheets over their entire areas in a substantially contained and high temperature atmosphere, exposing selected margins of said sheets to normal conditions outside of said contained atmosphere while maintaining the remaining sheet areas within said contained atmosphere, applying concentrated heat to said selected margins while so exposed to seal the same, and then again subjecting the entire area of the sheets to said contained atmosphere.

5. A method of sealing together the marginal edge portions of spaced sheets of glass to produce multiple sheet glass glazing units, comprising moving said sheets along a predetermined path through a tunnel-like furnace, preheating the entire area of said sheets in a substantially contained high temperature atmosphere in said furnace, providing concentrated heat sources at a sealing station disposed along said furnace and exteriorly of said furnace, aligning the marginal edge portions of said sheets with respect to said concentrated heat sources, impinging flames from said concentrated heat source onto said edge portions in an atmosphere exteriorly of said furnace to seal said edge portions together while maintaining other portions of said glass sheets within said furnace, exhausting heat from the flat portion of sheets adjacent said edge portions, and then again subjecting the entire area of said sheets to said contained atmosphere.

References Cited in the file of this patent

UNITED STATES PATENTS

| Number | Name | Date |
| --- | --- | --- |
| 844,705 | Arbogast | Feb. 19, 1907 |
| 1,577,581 | Knight | Mar. 23, 1926 |
| 1,617,955 | Kutchka | Feb. 15, 1927 |
| 1,702,522 | Owen | Feb. 19, 1929 |
| 1,738,039 | Cope et al. | Dec. 3, 1929 |
| 2,014,598 | Staples | Sept. 15, 1935 |
| 2,194,755 | Kell | Mar. 26, 1940 |
| 2,254,086 | Owen | Aug. 26, 1941 |
| 2,259,765 | Morris | Oct. 21, 1941 |
| 2,494,582 | Prokopec | Jan. 17, 1950 |
| 2,624,978 | Hohmann | Jan. 13, 1953 |
| 2,624,979 | Clever et al. | Jan. 13, 1953 |
| 2,761,249 | Olson et al. | Sept. 4, 1956 |

UNITED STATES PATENT OFFICE
CERTIFICATION OF CORRECTION

Patent No. 2,951,317                 September 6, 1960

John A. Woods

It is hereby certified that error appears in the above numbered patent requiring correction and that the said Letters Patent should read as corrected below.

Column 3, after line 8, insert the following as a paragraph:

> The apparatus by means of which the improved method of this invention may be carried out comprises a furnace having a sealing station at both sides of which are provided open port areas. Means are provided for continuously moving the marginal edge portions of spaced sheets of glass within said furnace and past said sealing station in accurately aligned relation with respect to concentrated heat sources in the form of gas burners disposed partially within said open port areas in operative position to seal together said marginal edge portions in the atmosphere exteriorly of the furnace. The particular construction of these burners forms no part of this invention, but is the subject matter of a separate application filed of even date herewith by Albert W. Olson and John A. Woods and assigned to the assignee of this invention. Disposed adjacent the open port areas and above the concentrated heat sources are exhaust means by which radiant heat from said sources may escape from the flat central portions of the glass sheets.

column 9, line 58, beginning with "It is to be", strike out all to and including "the following claims.", in line 63, same column 9.

Signed and sealed this 23rd day of May 1961.

(SEAL)
Attest:

ERNEST W. SWIDER                                              DAVID L. LADD
Attesting Officer                                             Commissioner of Patents